United States Patent
Spathias et al.

(10) Patent No.: US 8,371,799 B2
(45) Date of Patent: Feb. 12, 2013

(54) TURBO COMPRESSOR/JOURNAL FOIL BEARINGS WITH AXIAL RETAINERS

(75) Inventors: Adonis Kosta Spathias, Glendora, CA (US); Keith Alan Hurley, Garden Grove, CA (US); Hokuto Olson, Aliso Viejo, CA (US)

(73) Assignee: Honeywell International Inc., Morristown, NJ (US)

( * ) Notice: Subject to any disclaimer, the term of this patent is extended or adjusted under 35 U.S.C. 154(b) by 586 days.

(21) Appl. No.: 12/687,042

(22) Filed: Jan. 13, 2010

(65) Prior Publication Data

US 2011/0171020 A1    Jul. 14, 2011

(51) Int. Cl.
*F01D 25/16* (2006.01)

(52) U.S. Cl. ......... 415/1; 415/111; 415/170.1; 415/180; 415/229; 416/1; 416/174

(58) Field of Classification Search ............. 415/1, 110, 415/111, 170.1, 180, 229; 416/1, 174; 384/103–106
See application file for complete search history.

(56) References Cited

U.S. PATENT DOCUMENTS

| | | | | |
|---|---|---|---|---|
| 3,366,427 A * | 1/1968 | Silver et al. | .................... | 384/103 |
| 3,893,733 A * | 7/1975 | Silver et al. | .................... | 384/106 |
| 4,178,046 A * | 12/1979 | Silver et al. | .................... | 384/103 |
| 4,300,806 A * | 11/1981 | Heshmat | ........................ | 384/103 |
| 4,465,384 A * | 8/1984 | Heshmat et al. | ............. | 384/106 |
| 5,116,143 A * | 5/1992 | Saville et al. | ................. | 384/106 |
| 5,427,455 A * | 6/1995 | Bosley | ........................... | 384/106 |
| 5,634,723 A * | 6/1997 | Agrawal | ....................... | 384/106 |
| 5,911,510 A | 6/1999 | Saville | | |
| 5,988,885 A * | 11/1999 | Heshmat | ....................... | 384/106 |
| 6,036,435 A | 3/2000 | Oklejas | | |
| 7,494,282 B2 * | 2/2009 | Lee | ............................... | 384/106 |
| 2003/0169951 A1 * | 9/2003 | Nishijima et al. | ............. | 384/103 |
| 2005/0210875 A1 | 9/2005 | Larue | | |

* cited by examiner

*Primary Examiner* — Igor Kershteyn
(74) *Attorney, Agent, or Firm* — Shimokaji & Assoc., PC

(57) ABSTRACT

An apparatus and method for maintaining separation of two journal foil bearing assemblies, where each journal foil bearing assembly comprises one or more foils with lugs formed thereon for insertion into axial grooves of a bore, the means comprising a pin for insertion into each groove so that an edge of the lug that is inserted into the groove abuts the pin and is prevented from axially drifting along the bore. The pin provides a broad area along the lug edge so that the lug edge does not cut into the pin.

14 Claims, 8 Drawing Sheets

TURBO COMPRESSOR/JOURNAL FOIL BEARINGS WITH AXIAL RETAINERS

BACKGROUND OF THE INVENTION

The present invention relates generally to foil bearings used as journal bearings and spring assemblies associated with the foil bearing, and more particularly to a method and apparatus for maintaining a foil journal bearing and its associated spring assembly (if any) in axial position along a shaft within a bore of housing.

Fluid film bearings, also known as foil bearings in the prior art, are used in many diverse applications requiring high speed rotating turbo-machinery. A foil bearing generally comprises two relatively movable elements separated by a thin film of fluid lubricant, such as air, refrigerant, and other such fluids. For example, a foil bearing may comprise a stationary element that surrounds a rotating shaft journal, having predetermined radial clearance therebetween filled with air. The foil bearing may or may not be accompanied by an arcuate corrugated spring to assist in maintaining the optimum geometry of the foil bearing around the shaft.

FIG. 1 shows a cutaway drawing of a typical (one piece) turbo compressor housing 100 with a bore 110 therethrough to receive a rotating shaft (not shown). Midway through the bore 110, a channel 120 may be found which has a slightly larger inner diameter than that of the bore 110. As shown in FIG. 1, the bore 110 is shown as configured for two foil bearings, with each foil bearing being positioned along a region designated herein as a foil bearing surface 130, which comprises an inner wall 140 of the bore. At either end of the bore is located a ring retainer groove 150.

FIG. 2 shows an exploded view of how the shaft, the foil bearing system 240, and the housing 100 interrelate, according to the prior art. The foil bearing system 240 is assembled surrounding the shaft 160 and may be comprised of one or more journal foil bearing assemblies 200 with a sleeve 220 therebetween to hold them in a fixed, spaced apart relationship with each other and with respect to the bore 110. As part of the foil bearing system 240, retaining rings 230 are used on either end of the foil bearing system 240 to hold the bearing assembly in a fixed position within the bore 110 of the housing 100. The foil bearing system 240 is assembled by inserting a retaining ring 230 into a ring retainer groove 150 at one end of the bore 110 in the housing 100. Then a journal foil bearing assembly 200 is inserted against the retaining ring 230, followed by the sleeve 220 and another journal foil bearing assembly 200. When the last journal foil bearing assembly 200 has been inserted, the foil bearing assembly 240 may be held in place by inserting a second retaining ring 230 into the remaining ring retainer groove 150 at the opposite end of the bore 110. The shaft 160 may then be inserted through the foil bearing system 240 and supported thereby.

Referring now to FIG. 3, a cross sectional view of a journal foil bearing assembly 200 is shown. According to the figure, each journal foil bearing assembly 200 comprises one or more springs 202, which in turn may be fabricated from thin corrugated metal sheets with a retaining lug 210 along the sheet. The springs 202 are interposed between the bore and a foil 203 adjacent the shaft 160 and held from contact by the fluid. The foil 203 may also have a downturned retaining lug 210 formed along its extent. For purposes of this disclosure, there is no functional difference between a lug 210 formed in a spring 202 or a foil 203. Therefore, when reference is made to a retaining lug 210 hereafter, the reference should be interpreted as being either for a spring 202, a foil 203, or both. Furthermore, the retaining lug 210 may be formed in a number of ways, i.e. a downturned edge of the spring/foil or a welded bar running axially along the spring/foil intermediate its radial edges. The manner of forming a retaining lug 210 is not relevant to this disclosure and it should encompass any method and manner of providing a retaining lug 210 for preventing radial movement of the spring 202 or foil 203 about the centerline of the bore 110.

Generally, the springs 202 are identical in shape and are fabricated to traverse the circumference of a shaft 160 and occupy the space between the shaft 160 and the inner wall 140 of the bore 110. It should be noted that different applications may require different numbers of springs 202 and foils 203, and some applications may dispense altogether with the springs 202. The configuration shown in FIG. 3 is typical and used to illustrate the general concept only.

Significantly, the foil bearing assembly 200 must be restrained from rotating with the shaft. Therefore, each of the springs 202 and the foils 203 may have a retaining lug 210 formed along its outer surface away from the centerline of the shaft 160 in such a way as to align the spring/foil parallel with a centerline of the shaft 160 and bore 110 surrounding the shaft 160. For this purpose, a number of axial grooves 170 may be machined into the inner wall 140 of the bore 110 such that they are parallel with the centerline. The retaining lug 210 is formed to fit into an axial groove 170 in the inner wall 140 of the bore 110 to prevent the spring 202 or the foil 230 (and thus the journal foil bearing assembly 200) from rotating with the shaft 160 and to maintain its position along the foil bearing surface 130. The axial groove 170 generally runs the extent of the bore 110.

A turbo compressor machine may have one or more journal foil bearing assemblies 200 upon which the shaft 160 rotates. Typically, two such assemblies 200 are configured within the bore 110 of the housing 100. Each journal foil bearing assembly 200 must be held in place along the journals of the shaft 160. Standard retaining rings 230 are used to constrain axial movement of the journal foil bearing assemblies 200 on the outboard ends of the shaft 160, where each retaining ring 230 is held in a retaining ring groove 150 (FIG. 1).

However, on the inboard side of each journal foil bearing assembly 200, installation or use of a retaining ring 230 is difficult due to space limitations, particularly when the housing is fabricated from a single casting. Current practice is to install a single coiled up sleeve 220 fabricated of thin sheet metal in the channel 120 between the two foil bearing surfaces 130 (FIGS. 1 and 2). The sleeve 220 has an axial slit which allows the sleeve 220 to be compressed into a smaller diameter, i.e. a diameter less than that of the bore 110, so that the sleeve 220 can be inserted into the bore 110 and allowed to "spring back" into its original diameter which coincides with the inner diameter of the channel 120.

Referring to FIG. 4, the journal foil bearing assembly 200 is shown as it is held in place by the sleeve 220. According to the figure, the axial groove 170 extends of sufficient depth along the inner wall 140 so that the axial groove 170 opens into the channel 120. This opening allows a sleeve edge 221 to abut a lug edge 212, and thereby prevent the journal foil bearing assembly 200 from drifting inwardly along the shaft 160. The sleeve edge 221 and the lug edge 212 are in approximate 90° relationship to one another and therefore the point of contact is approximately the width of the lug edge 212 and the sleeve edge 221, which is very small in area. Since this point of contact is so small, the sleeve edge 221 and the lug edge 212 can easily cut into or wear into the other.

As can be seen, an improved mechanism is needed to maintain axial separation of the foil bearings along the shaft without excessive wear.

SUMMARY OF THE INVENTION

In one aspect of the present invention, a bearing system is provided for supporting a shaft for rotational movement, where the bearing system comprises a first foil bearing assembly for insertion between the shaft and an inner wall of a bore, the first foil bearing assembly comprising one or more foils, each foil curved in an arc around the shaft, each foil having a lug adapted for insertion into an axial groove in the inner wall, the axial groove parallel with a centerline of the bore, wherein the lug constrains the foil from rotational movement about the shaft; and a pin for insertion into the axial groove, the pin having a first end and a second end, the first end abutting an edge of the lug in the groove.

In a further aspect of the present invention, a turbo compressor is provided, where the turbo compressor comprises a housing; a bore through the housing with the bore having an axial groove extending along an inner wall of the bore, the axial groove being parallel with a centerline of the bore; a shaft received by the bore; an foil bearing assembly positioned between the shaft and the inner wall, the foil bearing assembly comprising a foil curved in an arc around the shaft and a lug adapted for insertion into the axial groove, the lug having a lug end, wherein the lug constrains the foil from rotational movement about the shaft; and a pin positioned in the axial groove, the pin having a first pin end and a second pin end, the first pin end positioned against the lug end, wherein the lug end abuts the first pin end to constrain the foil from axial movement along the bore.

In another aspect of the present invention, a method for restraining journal foil bearing assemblies from migration along a bore comprises the following steps: positioning the lug of a foil of a first journal foil bearing assembly in an axial groove in an inner wall of the bore and parallel with a centerline of the bore, so that the lug prevents the foil from moving radially about the bore with a shaft inserted therethrough; and preventing the foil from migrating axially along the bore by positioning a pin with a first end and a second end between the foil and an object, the first end abutting the lug of the foil and the second end abutting the object.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The invention may find application in any machine featuring a rotating shaft which maintains a rotational speed sufficient to justify the use of an foil bearing. In particular, such machines employing a plurality of foil bearings along the same shaft may use the invention to maintain the foil bearings in proper relationship along the shaft. The invention may increase the time between replacement of the foil bearings due to excessive wear along the lugs of the foil bearings.

Broadly, embodiments of the present invention generally provide a method and a restraint device which replaces the sleeve of the prior art with one or more pins that provide improved wear resistance to the lug edges. The pins may function as a component of a bearing system that may comprise a plurality of foil bearing assemblies and sets of pins correspond in number to the number of lugs associated with springs and foils which comprise each foil bearing assembly.

Figure 1:
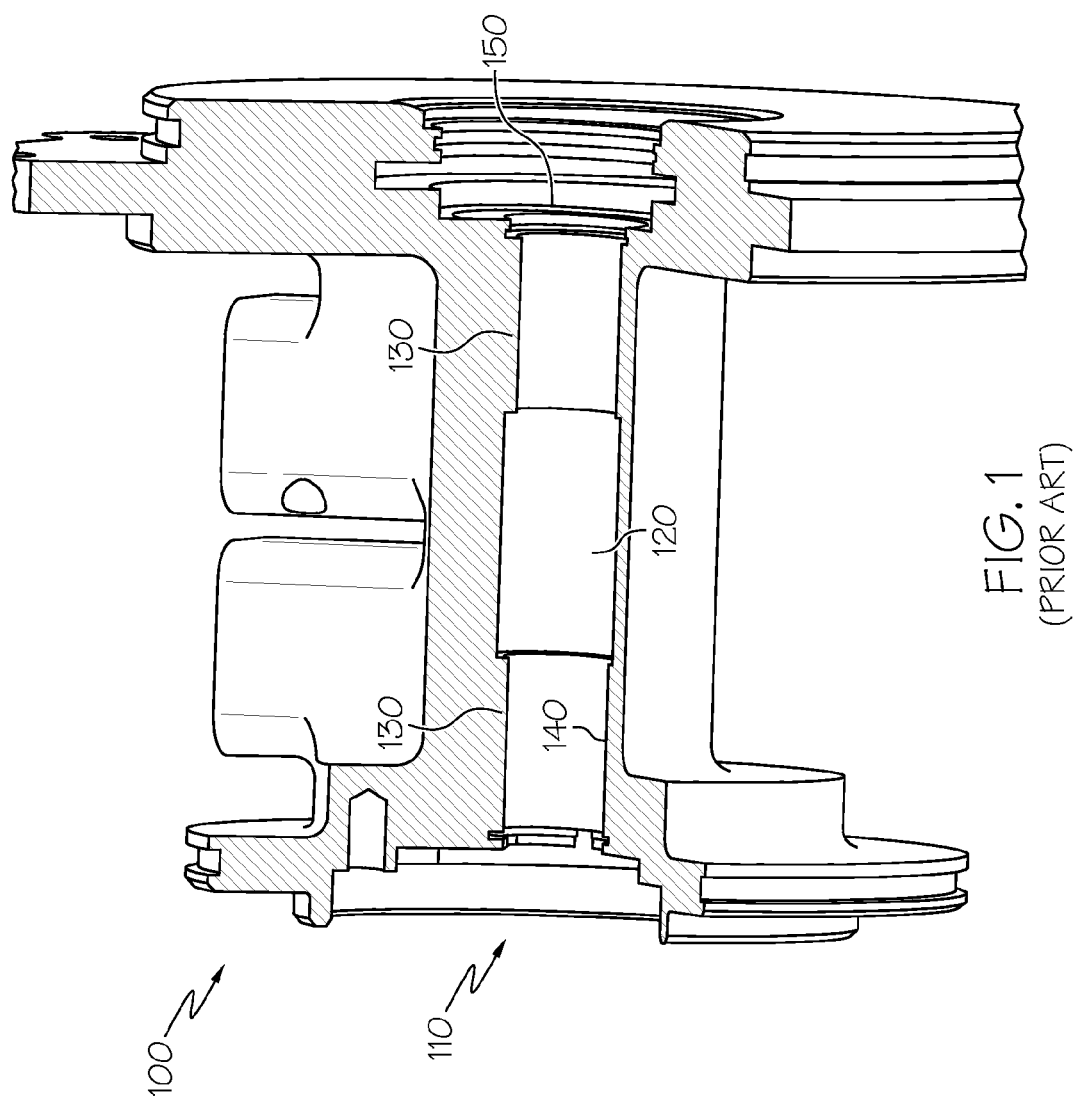
FIG. 1 shows a cutaway perspective drawing of a turbo compressor housing and a bore therethrough, according to the prior art.
Figure 2:
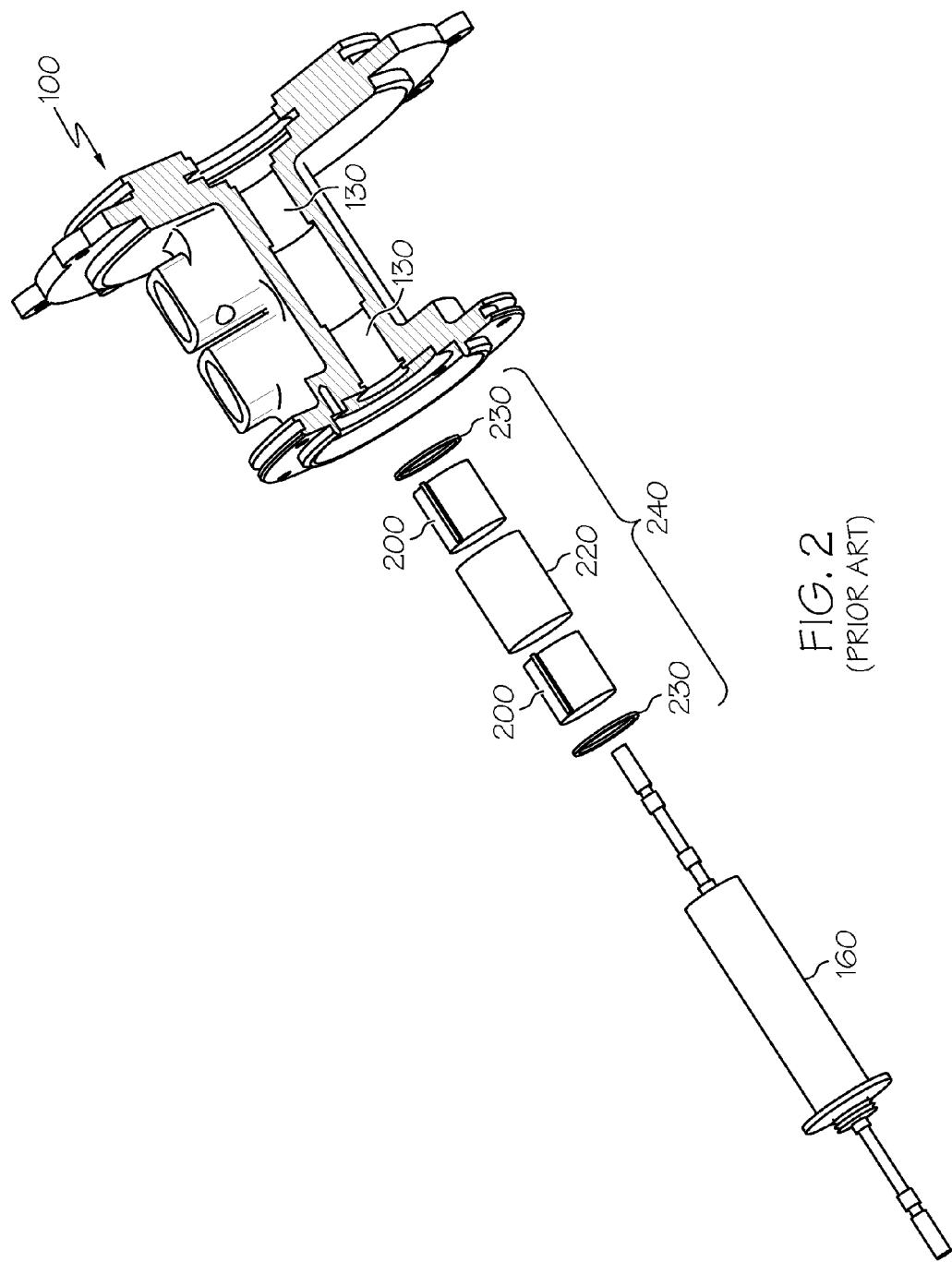
FIG. 2 shows an exploded parts drawing, in perspective, of an arrangement of foil bearing assemblies as they are configured along a shaft in the turbo compressor housing bore, according to the prior art.
Figure 3:
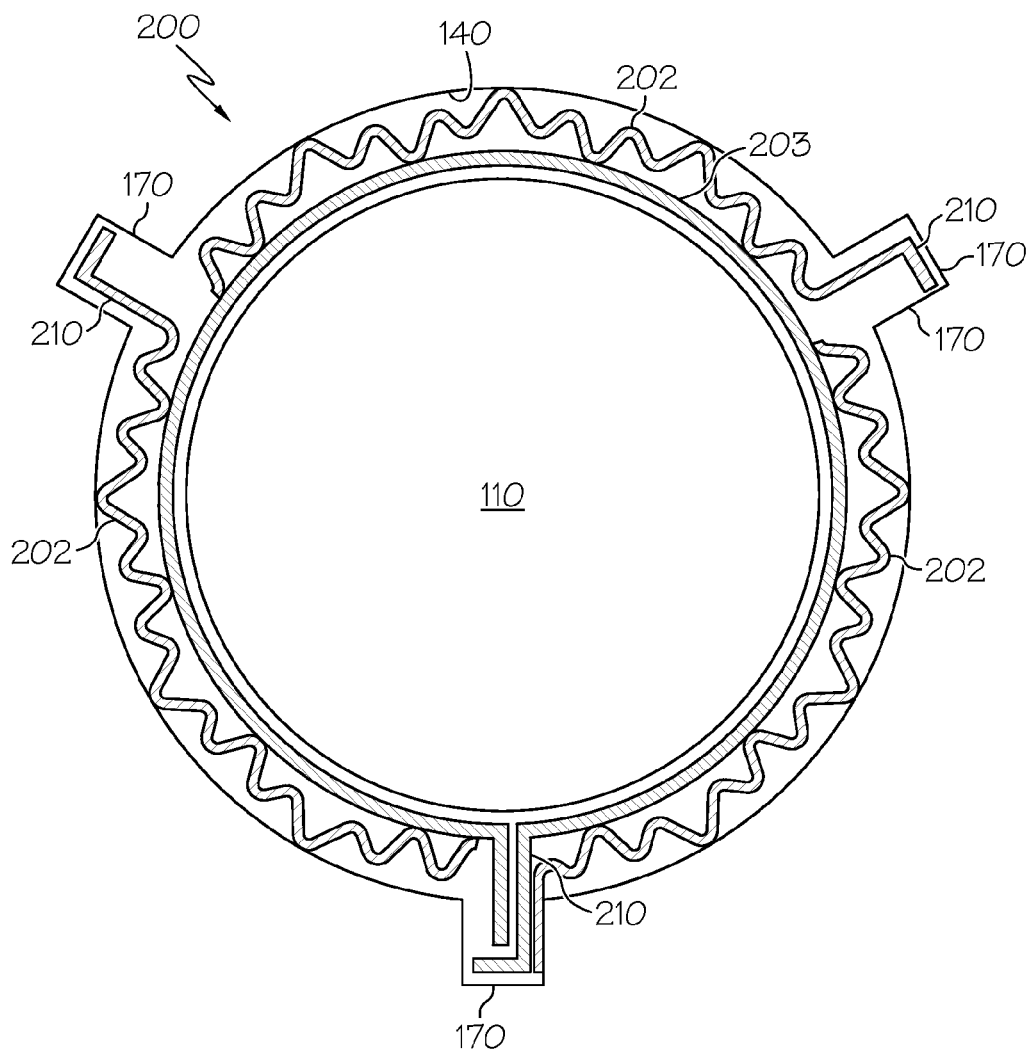
FIG. 3 shows a cross sectional view of the bearing assembly of FIG. 2 having three foils equidistantly positioned about a shaft, according to the prior art.
Figure 4:
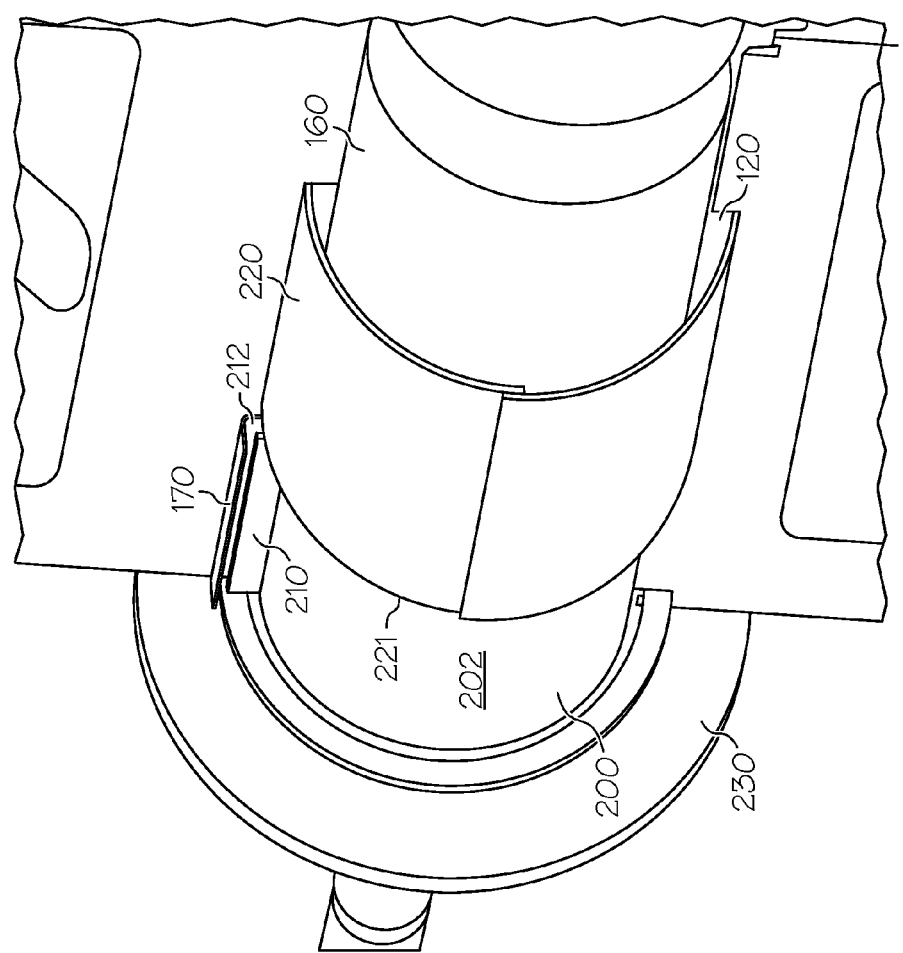
FIG. 4 shows a cutaway perspective drawing of a bore in the turbo compressor housing shown in FIG. 1 in order to illustrate the relationship between the axial grooves, the channel, the sleeve and the lugs, according to the prior art.
Figure 5:
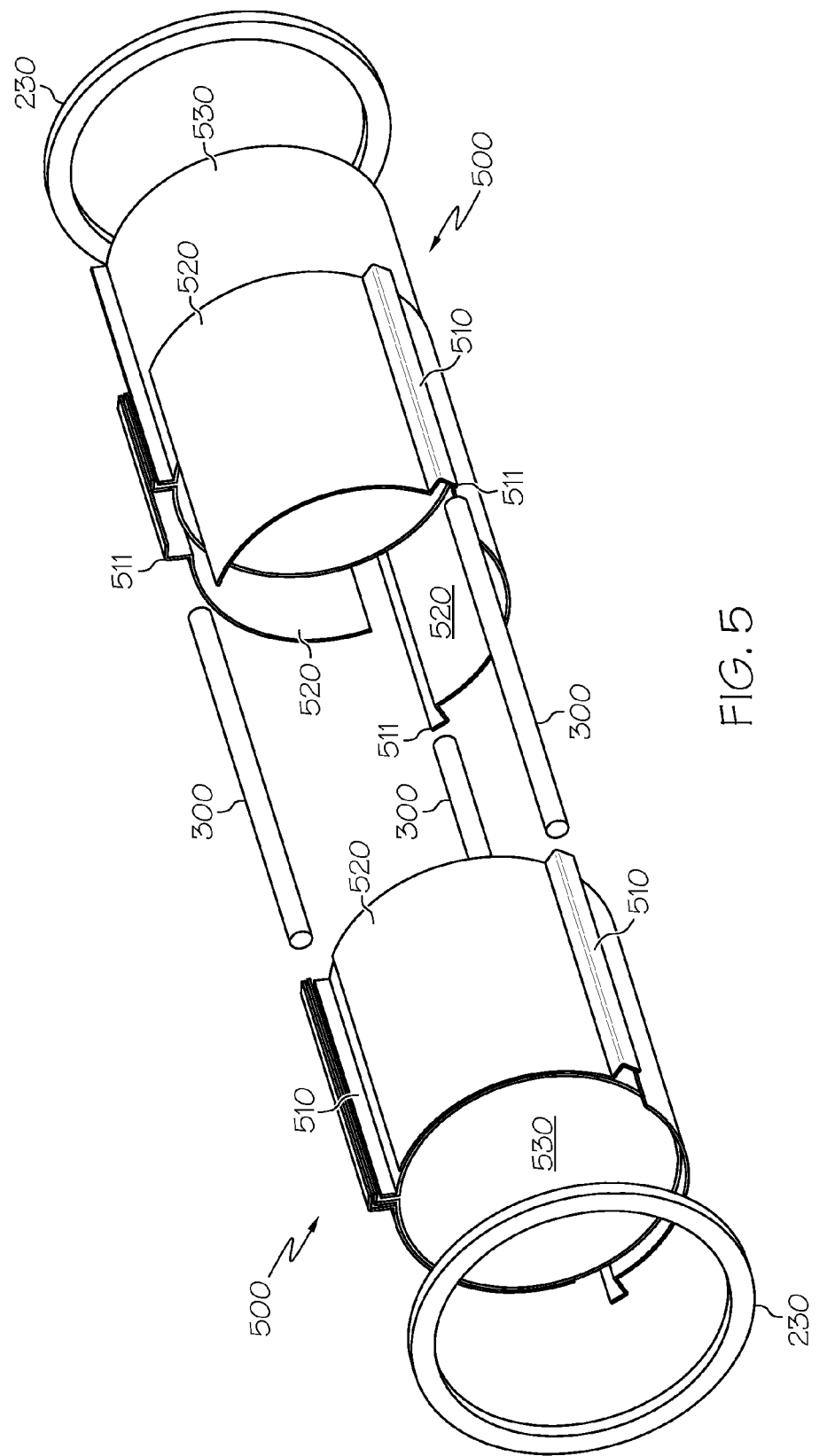
FIG. 5 shows a perspective drawing of two bearing assemblies in which the sleeve has been replaced by a plurality of pins, according to an embodiment of the invention.

Referring now to FIG. 5, an embodiment of the present invention may be seen. According to the embodiment, the sleeve 220, as described above with reference to FIG. 2 of the prior art, may be replaced by one or more pins 300. The ends of each pin 300 may abut the lug edges 511, for as many lugs as may be configured for the springs 520 and foils 530 comprising the foil bearing. As illustrated in the embodiment of the drawing as shown in FIG. 5, two journal foil bearing assemblies 500 may be shown, each assembly comprising a single foil 530 with a lug 510 having a lug edge 511. In addition, each assembly may also comprise three springs 520, each having a lug 510 having a lug edge 511. Note that the lug 510 of the foil 530 may be coincident with a lug 510 of one of the springs 520. Each pin 300 may be inserted into that portion of the axial groove 170 that traverses the channel 120 (as shown in the prior art in FIGS. 1, 3, and 4). While a channel 120 (see FIGS. 1 and 4) may not be necessary according to embodiments of the present invention, such a channel 120 may continue to be fabricated in order to remove metal from the bore 110 and thus reduce weight of the housing 100.

The geometry of the axial grooves 170 into which lugs 510 are inserted may be modified to accommodate the pins 300 and enable the pins 300 to be inserted from an end of the bore 110 and slid into place. The pins 300 may fill the axial space between the two journal foil bearing assemblies 500 (FIG. 5).

Both foil bearing surfaces 130 and the space between them may be combined into a single long bore 110 having a constant diameter, with the axial grooves 170 extending between the ends of the bore 110. The pins 300 may thereby provide axial separation of the two journal foil bearing assemblies 500 by occupying the axial groove 170 therebetween. The pins 300 may be provided as a set of pins having a number of pins equal in number to the number of foils in the journal foil bearing assembly 500. However, housing material may be removed to form a channel 120 between the two journal foil bearing assemblies 500 for purposes of saving weight. The channel 120 may be shorter in length than that of the pins 300 so that the pins 300 may still be secured in place at their ends.

In another embodiment, the journal foil bearing assembly 500 may be positioned away from the end of the bore 110, so that a retaining ring 530 may be difficult to insert internally to the bore 110. In such a scenario, pins 300 may be inserted into the axial grooves 170 between the ring retainer groove 150 and the journal foil bearing assembly 500 and then captured in place by installing a retainer ring 530 into the ring retainer groove 150.

Figure 6:
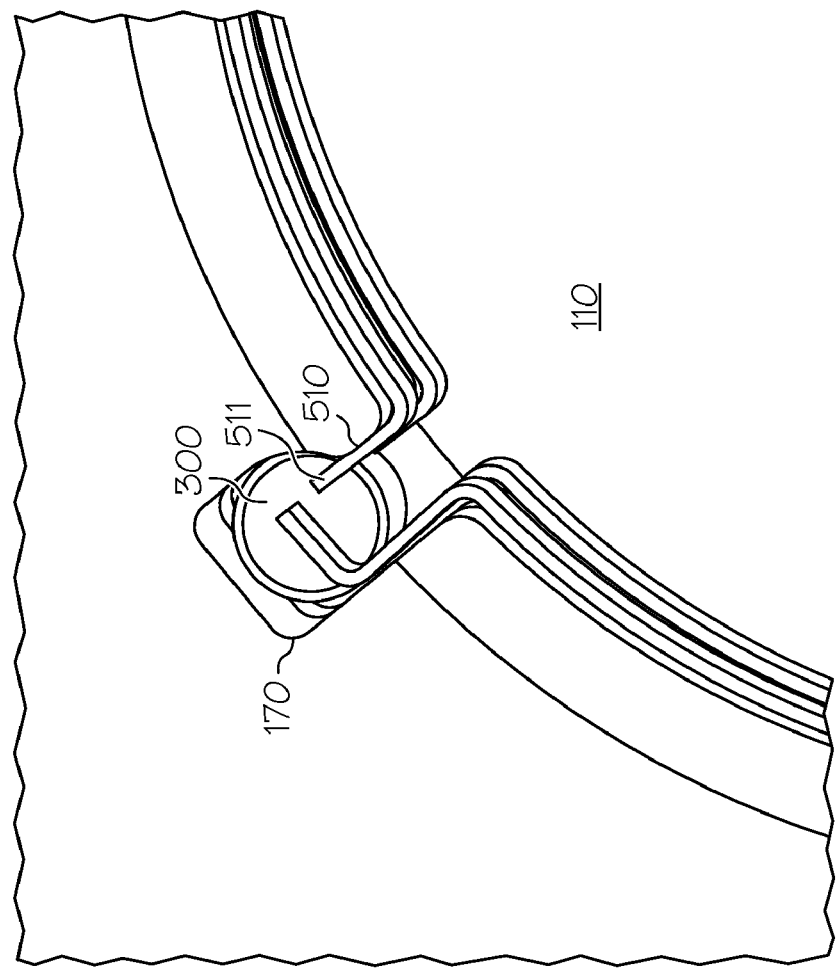
FIG. 6 shows a close up view of an axial groove and the relationship between an end of the pin and the lugs of the bearing assembly, according to an embodiment of the invention.

Referring now to FIG. 6, a close up view of an axial groove and the relationship between an end of the pin and the lugs of the foil bearing assembly may be seen. According to FIG. 6, an end of pin 300 may be seen as it occupies the recess of axial groove 170. Note that the geometry of axial groove 170 may be altered as by machining to capture pin 300 and to hold it away from the bore 100. Lug edge 511 of lug 510 may occupy the same axial groove 170 and rest against the end of pin 300 to be prevented from moving along the bore 110.

Figure 7:
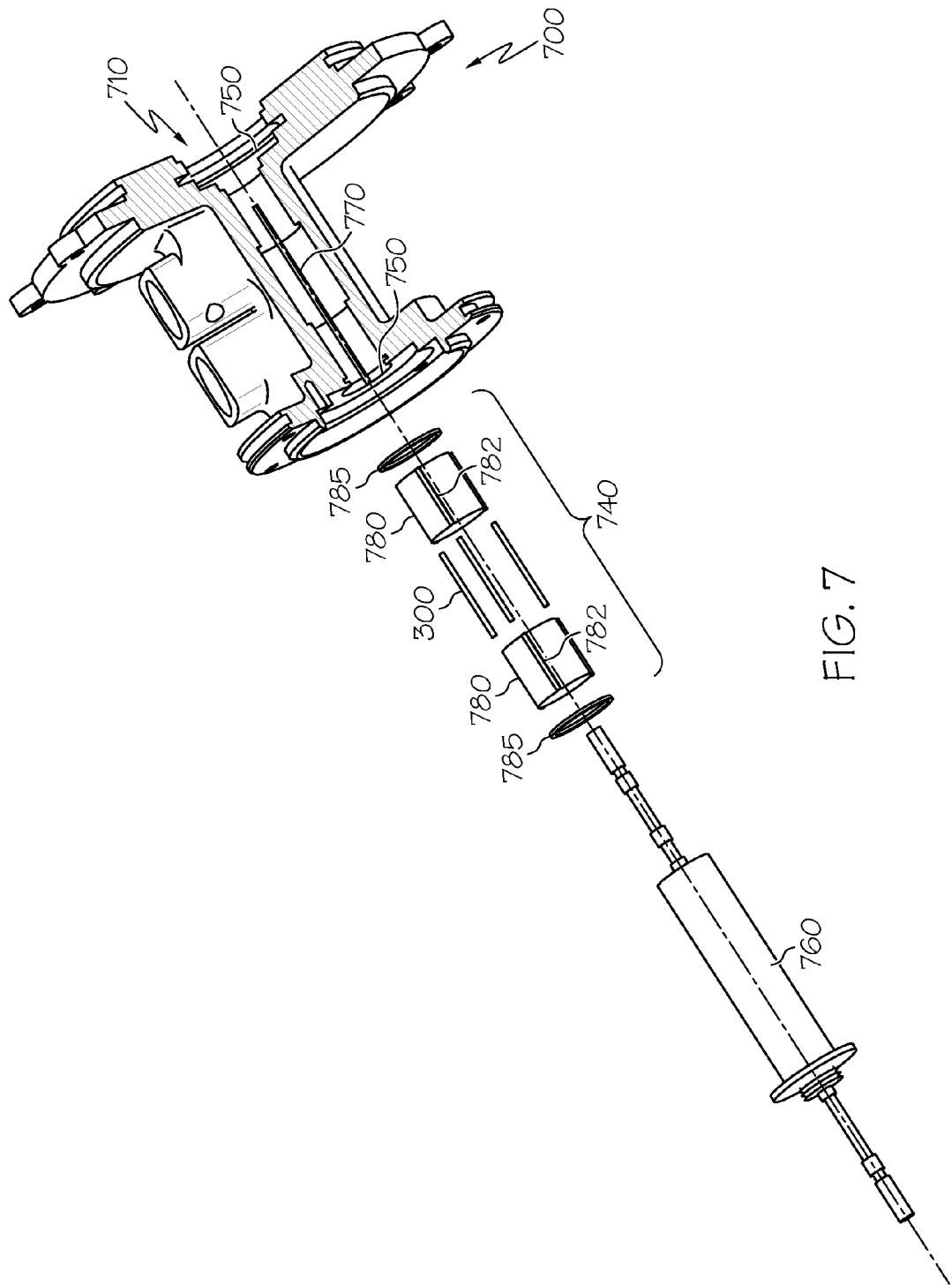
FIG. 7 shows an exploded parts drawing, in perspective, of an arrangement of foil bearing assemblies and pins as they are configured along a shaft in the turbo compressor housing bore, according to an embodiment of the invention.

FIG. 7 shows an exploded view of how the shaft 760, the bearing system 740, and the housing 700 interrelate, according to an embodiment of the invention. The bearing system 740 may be assembled surrounding the shaft 760 and may be comprised of one or more journal foil bearing assemblies 780 having a set of pins 300 therebetween to hold them in a fixed, spaced apart relationship. As part of the bearing system 740, a plurality of retaining rings 785 are placed on either end of the bearing system 740 to hold the bearing system 740 in a fixed position within the housing 700. The bearing system 740 may be assembled by inserting a retaining ring 785 into a ring retainer groove 750 at one end of the bore 710 in the housing 700. A journal foil bearing assembly 780 may be inserted against the retaining ring 785, with the lugs 782 thereof being placed into the axial grooves 770 along the bore 710, followed by the set of pins 300 and another journal foil bearing assembly 780. The ends of each pin 300 may abut a lug edge (not shown) of each lug 782 occupying the same axial groove 770 as the pin 300. When the last journal foil bearing assembly 780 has been inserted, the bearing system 740 may be held in place by inserting a second retaining ring 785 into the remaining ring retainer groove 750 at the opposing end of the bore 710. The shaft 760 may then be inserted through the bearing system 740 and supported thereby.

Figure 8:
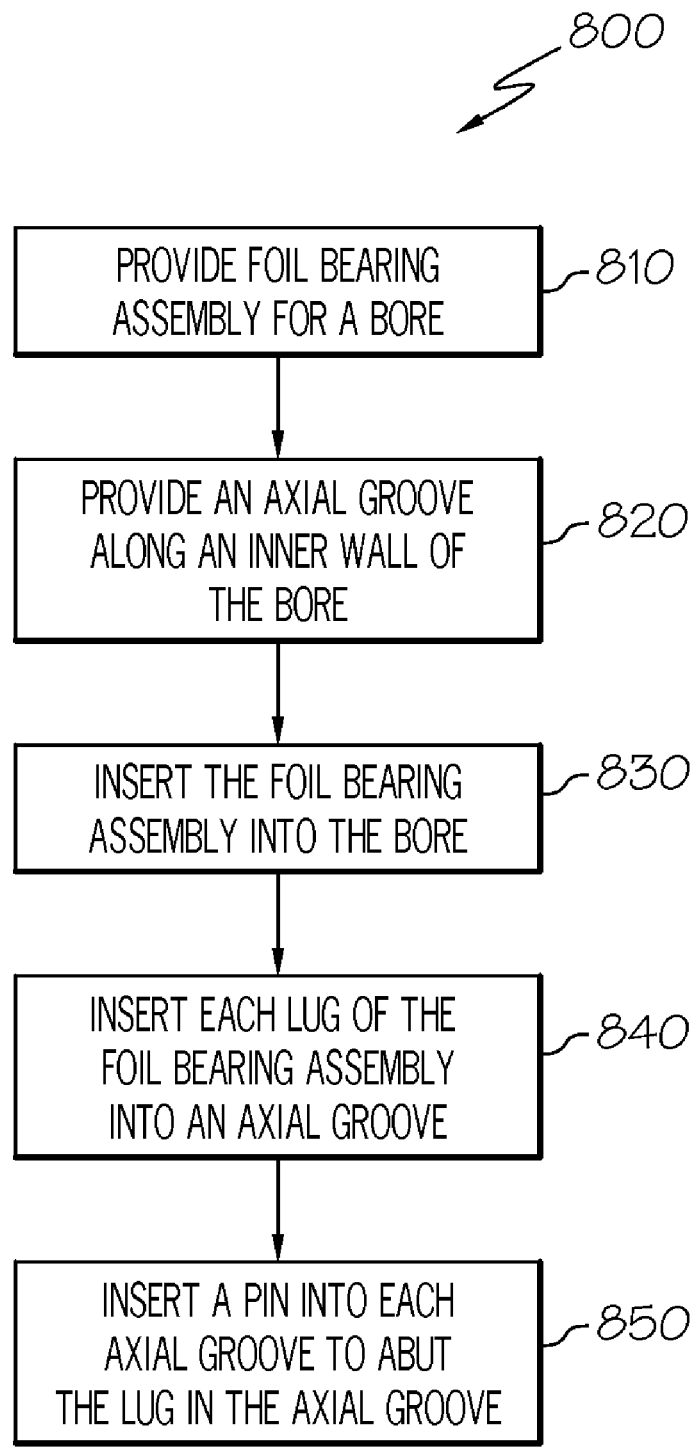
FIG. 8 shows a flow diagram of a method for restraining a foil bearing from migration along a shaft, according to an embodiment of the invention.

In another embodiment of the invention, a method for restraining journal foil bearing assemblies from migration along a bore may be provided. Referring to the flow diagram 800 shown in FIG. 8, the method may be applied for an journal foil bearing assembly having one or more foils, each formed as an arc generally conforming to the curvature of a bore, each foil having a downturned, extending retaining lug that may extend radially away from a centerline of the bore. According to the block labeled 810, each lug of the journal foil bearing assembly may be positioned in an axial groove extending along an inner wall of the bore and parallel with its centerline. In this manner, the lug may be captured by the axial groove so that it is prevented from moving radially about the bore with a shaft that is inserted therethrough. Each foil and spring, and thus the journal foil bearing assembly, may be held in axial position along the bore by abutting an edge of the lug with a first end of a pin, the second end of which abuts an object, according to the block labeled 820.

The opposing end of each pin may abut against another object, so that the foils of the journal foil bearing assembly are maintained in general axial alignment with each other. When two journal foil bearing assemblies are present, each pin may be installed therebetween so that the ends of the pin may abut the corresponding lugs of the assemblies which are inserted therein. Ordinarily the journal foil bearing assemblies may be installed so that one end of each lug abuts a pin in the axial groove and the other end of each lug abuts a retaining ring inserted into a ring retainer groove radially fabricated at an end of the bore. In such a situation, the pins may be regarded as "internal pins", since they are placed between two journal foil bearing assemblies internally to the bore.

However, under certain conditions, it may be desirable to space a foil bearing assembly inwardly along the bore away from the normal placement of the ring retainer groove. In such situations, a pin may be inserted into each axial groove so that one end of the pin abuts the retaining ring and the other end of the pin abuts a lug, thus maintaining the journal foil bearing assembly a fixed distance away from and end of the bore. In such a situation, the pins may be regarded as "external pins", since they are placed immediately adjacent the retaining ring at the end of the bore.

Under still other conditions, it may be desirable to separately restrain two sets of journal foil bearing assemblies, each set having axial grooves for lugs of that set and only that set. For example, two sets of journal foil bearing assemblies may be provided, with each set containing a plurality of journal foil bearing assemblies each having three foils. Six axial grooves may be provided by the method, with one set of journal foil bearing assemblies assigned three axial grooves and the other set assigned the other three axial grooves. Thus, it may be possible to provide pins for each set of journal foil bearing assemblies to be installed in the grooves assigned to that set of journal foil bearing assemblies, and bypassing the other set. Other permutations may be evident upon inspection. The method does not depend upon the number of foils and springs in each foil bearing assembly or whether or not each foil bearing assembly has the same number of foils and springs. Furthermore, while the number of axial grooves may typically be no greater than the sum of the extending from each of the foil bearing assemblies comprising the foil bearing system for the shaft, the method does not impose a limitation on the manner in which the axial grooves are assigned to different journal foil bearing assemblies, the number of journal foil bearing assemblies having lugs occupying the same axial groove, or that two journal foil bearing assemblies separated by pins be physically adjacent along the shaft. Different geometries and arrangements of this nature may be considered to be within the scope of the invention. The invention does not impose an upper limit on the number of axial grooves that may be provided, and additional unassigned axial grooves may be present for other purposes without restricting the scope of the invention.

It should be noted that the invention does not impose a restriction on the cross sectional geometry of the pins or on their continuity. For illustration, the pins shown in the drawings have a circular cross section, but other cross sections may be used and still be considered as within the scope of the invention; for example, pins may have a rectangular, square, oval, or oblate spheroid cross section depending upon the application. The invention and method do not depend on the cross sectional geometry of the pins, and each pin associated with a journal foil bearing assembly may have a different cross sectional geometry without departing from the scope of the invention. Furthermore, although each pin has been described as being a single. monolithic object, the pin may be sectioned into a plurality of separate portions abutting each other and all enclosed within a groove, without departing from the scope of the invention. For example, each pin may have its end portions fabricated from a material having a composition that is peculiar to the application and its mid section portion fabricated from a different material for purposes of weight reduction. The portions may be mechanically joined or unconnected within the axial groove, as long as the geometry of the axial groove is such that the axial groove maintains the portions in alignment without allowing any portion to migrate out of the axial groove.

The disclosure has referred to retaining rings inserted within grooves as being objects against which the foil bearing or the pins abut, in order to maintain required axial spacing of the foil bearing along the shaft. The retaining rings functionally terminates the axial groove at the ends of the bore. However, it should be noted that the use of retainer rings is illustrative and other means may be used to provide a fixed surface against which the foil bearing or the pin abuts. For example, the housing may be divided into two portions and attached together (as by bolts or welding), with a portion of one housing providing the fixed surface for terminating the axial grooves along the bore of the other housing. Present technology makes it difficult to fabricate axial grooves that are "stopped" at the ends, that is, imposed along the inner wall of the bore with the ends of the axial groove ending a short distance from the ends of the bore thus providing a fixed surface against which the end of a pin may abut. Should such technology be developed, then stopped axial grooves may be used to contain pins according to the scope of the invention.

It should be understood, of course, that the foregoing relates to exemplary embodiments of the invention and that modifications may be made without departing from the spirit and scope of the invention as set forth in the following claims.

We claim:

1. A bearing system supporting a shaft for rotational movement, the bearing system comprising:
    a first foil bearing assembly for insertion between the shaft and an inner wall of a bore, the first foil bearing assembly comprising one or more foils, each foil curved in an arc around the shaft, each foil having a lug adapted for insertion into an axial groove in the inner wall, the axial groove parallel with a centerline of the bore, wherein the lug constrains the foil from rotational movement about the shaft;
    a retaining ring for insertion into a retaining ring groove in the inner wall at an end of the bore; and
    a pin for insertion into the axial groove, the pin having a first end and a second end, the first end abutting an edge of the lug in the groove, and the second end abutting the retaining ring.

2. The bearing system described in claim 1, further comprising
    a second foil bearing assembly for insertion between the shaft and the inner wall, the lugs of the foils in the second foil bearing assembly inserted into the axial groove and abutting a second end of each pin.

3. The bearing system described in claim 1, wherein the first foil bearing assembly comprises three foils and the bearing system comprises three pins.

4. The bearing system described in claim 1, wherein the pin comprises a plurality of portions that are restrained by the axial groove from migrating into the bore and thereby maintained in alignment.

5. The bearing system described in claim 4, wherein the each portion of the plurality of portions of the pin is fabricated from a material selected from a plurality of different materials.

6. A turbo compressor comprising:
    a housing;
    a bore through the housing, the bore having an axial groove extending along an inner wall of the bore, the axial groove parallel with a centerline of the bore;
    a shaft received by the bore;
    a first foil bearing assembly positioned between the shaft and the inner wall, the first foil bearing comprising a foil curved in an arc around the shaft and a lug adapted for insertion into the axial groove, the lug having a lug end, wherein the lug constrains the foil from rotational movement about the shaft;
    a retaining ring for insertion into a retaining ring groove in the inner wall at an end of the bore; and
    a pin positioned in the axial groove, the pin having a first pin end and a second pin end, the first pin end abutting the lug end to constrain the foil from axial movement along the bore, and the second pin end abutting the retaining ring.

7. The turbo compressor described in claim 6, further comprising:
    a second foil bearing assembly having a second lug with a second lug end, the second lug inserted into the axial groove so that the second lug end abuts the second pin end.

8. The turbo compressor described in claim 6, wherein:
    the turbo compressor comprises a second foil bearing assembly;
    the first and second foil bearing assemblies are each comprised of an identical number of foils;
    a number of axial grooves is identical to the number of foils, and
    a number of pins is identical to the number of foils in the first foil bearing assembly.

9. A method for restraining journal foil bearing assemblies from migration along a bore, the method comprising the steps of:
    positioning the lug of a foil of a first journal foil bearing assembly in an axial groove in an inner wall of the bore and parallel with a centerline of the bore, wherein the lug prevents the foil from moving radially about the bore with a shaft inserted therethrough;
    preventing the foil from migrating axially along the bore by positioning a pin with a first end and a second end between the foil and an object, the first end abutting the lug of the foil and the second end abutting an object;
    adjusting a length of the pin to position the first journal foil bearing assembly about a journal of a shaft inserted through both the bore and the first journal foil bearing assembly; and
    supporting the shaft along the journal for rotational movement with the first journal foil bearing assembly.

10. The method for restraining journal foil bearing assemblies described in claim 9, wherein the pin is within the axial groove so that it does not protrude into the bore.

11. The method for restraining journal foil bearing assemblies described in claim 9, wherein the second end of the pin abuts an object selected from the group consisting of a lug from a second journal foil bearing assembly and a retaining ring inserted into a ring retainer groove radially fabricated at an end of the bore.

12. The method for restraining journal foil bearing assemblies described in claim 9, wherein
    the lug of a foil of a second journal foil bearing assembly is positioned in the axial groove.

13. The method for restraining journal foil bearing assemblies described in claim 12, wherein the lugs of each journal foil bearing assembly are inserted into a common axial groove.

14. The method for restraining journal foil bearing assemblies described in claim 13, further comprising the step of maintaining a fixed distance between adjacent journal foil bearing assemblies by using a set of pins containing a number of pins equal to the number of foils in each journal foil bearing assembly.

* * * * *